Patented Aug. 7, 1934

1,969,387

UNITED STATES PATENT OFFICE 1,969,387

CLEANSING AND POLISHING PREPARATION

Joseph A. Tumbler, Baltimore, Md., assignor to J. A. Tumbler Laboratories, Baltimore, Md.

No Drawing. Application September 13, 1929, Serial No. 392,493

20 Claims. (Cl. 134—24)

My invention relates to a preparation, the primary use of which is to serve as a polish, although it has other attributes such as the cleansing of surfaces to which it is applied. While it may be used on all surfaces where polishing is desired, the specific application to coated surfaces such as those of paint, enamel, varnish, lacquer, is the more important use contemplated by the invention, particularly surfaces which are analogous to those of automobile bodies or present similar polishing problems. This use is not intended to be restrictive as it may be applied to furniture, woodwork and other obvious situations where a high gloss and durable polish is desired.

It has been proposed to use in the preparation of polishes the neutralized sulphonic derivatives of oleic acid, which have been procured from certain vegetable oils such as castor oil, cotton seed oil and linseed oils, but such sulphonated oils lack lasting luster, do not clean properly, are greasy and they readily settle out. Another disadvantage of such use is the cost of preparation of the sulphonated oil. In the manufacture of Turkey red oil, for example, which is a known sulphonated castor oil, the castor oil must be treated with concentrated sulphuric acid and the temperature must be maintained below 35° C., in order that the following reaction may take place:

$$C_{18}H_{33}O_2.OH + H_2SO_4 = H_2O + C_{18}H_{33}O_2.O.SO_3.H$$

The product must be washed with water and then with sodium sulphate and finally neutralized with sodium hydroxide or ammonia. While this neutralized preparation has certain solvent and emulsifying properties, its cost, greasiness and other disadvantages render it undesirable as a polish constituent. I have discovered that oleic acid oils and their homologues can be beneficially used in polish preparations with low cost and other advantages materially superior to those of the sulphonated oils, if the oleic acid is preliminarily treated with air, oxygen, or any other oxidizing substance so that an oxidation product of oleic acid results. The treatment comprises blowing the oleic acid with air until a frothy mass results. The reactions which take place are probably as follows:

$$2C_{17}H_{33}COOH + O_2 + H_2O \rightarrow 2C_{18}H_{34}O_2(OH)_2$$

dihydroxystearic acid $$C_{18}H_{34}O_2(OH)_2 + 3O_2 \rightarrow 2C_7H_{14}(COOH)_2 2H_2O$$

azelaic acid. It is my theory that partial oxidation and polymerization of the oleic acid occurs, though I am not prepared to state accurately the degree to which the above reactions take place. With particular reference to castor oil, which contains a predominant amount of triricinolein, the glyceride of ricinoleic acid $$C_{17}H_{32}.(OH).(COOH),$$

the blowing with air partially oxidizes it into a product which is known as "pale blown" castor oil. This particular product I use as an essential element of my polish preparation. I have discovered that this product forms a stable emulsion under conditions hereinafter indicated.

In the preparation of my polish, I add to "pale blown" castor oil which is heavy and viscous, an amount of a suitable chlorhydrocarbon preferably of the cyclic series, to serve as a solvent cleanser and viscosity reducer of the blown oil. In a separate container, I mix water, mineral oil and ammonia water. The mixture of blown castor oil and chlorhydrocarbon is added to the mixture of water, oil and ammonia and after agitating the resulting composition, petroleum spirit is finally stirred in. The preparation is run through a colloidal mill and is then ready for use.

A preferred formula of my polish is compounded specifically as follows: To 3½ gallons of pale blown castor oil, I add ¾ gallon of orthodichlorbenzol. This is mixture #1. To 15 gallons of water, I add 11 gallons of neutral pale mineral oil and ¾ gallon of ammonia, which has been previously made up one part of NH₃ of 26 degrees Baumé and four parts of water. This is mixture #2. Mixture #1 and mixture #2 are combined and agitated for about five minutes. 3½ gallons of special petroleum spirit is added and the whole mass is now stirred about ten minutes. It is then run through a colloidal mill and is ready for use. Alternatively, all of the ingredients may be mixed in a single batch and passed through the colloidal mill, which breaks up the particles to a fine degree. This obviates preparing separate mixtures.

The mineral oil has a cleansing function and also gives luster and forms an emulsion. The ammonia helps in the emulsion. The special petroleum spirit is not essential but aids in its cleaning and solvent action. The chlorhydrocarbon may be replaced by denatured alcohol or some such aliphatic paraffin derivative, but this is not generally desirable as it tends to break the emulsion.

While I have indicated that the air blowing of the castor oil probably converts it to a partial oxidation product and gives it the high luster, I do not wish to be limited to this theory of operation. There are other considerations which may account for the superiority of my product over that of the sulphonated oleic acid oils. One such consideration is that the enzyme lipase, one type of which is contained in castor seeds associated with trypsin, has the power of breaking up fats into glycerol and fatty acids. This hydrolysis occurs merely on contact of the oil with water, if both are allowed to stand a sufficient length of time. These enzymes are sensitive to changes and their action may be assisted or promoted by associated substances, known as co-enzymes or activators. On the other hand, their action may be interfered with or arrested by paralyzers or poisons. One such known poison is sulphur, and it is my theory that sulphonation of castor oil acts as an enzyme poison, thus destroying the value of the lipase as a hydrolysis aid. Added to this is the possibility that air blowing acts as an activator and thus tends to speed up the hydrolysis. It is evident that these conclusions are reasonable when it is seen that "pale blown" castor oil is not as greasy as sulphonated castor oil and gives a higher luster.

As stated hereinbefore my polish is particularly applicable for use on automobiles. An automobile in motion meets the powerful resistance of dust-laden air. The abrasive force is strong enough to dull the finish, which together with presence in air of a certain amount of heated oxygen, carbon dioxide, sulphur dioxide and moisture act chemically upon the finish and cause the same to become tarnished and discolored. The result is a greyish, oily, unsightly film which dulls and eventually destroys the beauty of the original finish. Soap and water will tend to remove the dust and some oil and grease, but no amount of washing can remove the dull film which is chemically combined with the surface. The polish hereindescribed removes this film without injury to the natural finish and leaves a dry, hard, transparent polish of high luster, impervious to water and unaffected by atmospheric conditions. Furthermore, it is non-inflammable and non-combustible.

As will be obvious to those skilled in the art, I do not wish to be limited by my preferred formula, nor to any specific ingredients therein. I may use any homologue of oleic acid or oleic acid oils which have not been sulphonated, or any air blown derivative of the same, so that when properly reduced in viscosity or dissolved, will form an emulsion that will be exceedingly dispersed in water.

I reserve the right to claim in a continuation of the present application all common subject matter not claimed in the present application.

I claim:

1. A polishing and cleaning preparation comprising "pale blown" castor oil, mineral oil, ammonia, orthodichlorbenzol, water, and petroleum spirit.

2. An emulsified preparation for polish comprising water, unsaponified air-blown castor oil and a lubricating oil, said castor oil being blown at a temperature and pressure at which it is substantially immiscible with said lubricating oil, said castor oil and said lubricating oil being dispersed in said water.

3. A liquid polishing composition of substantially unsaponified oxidized castor oil, and a hydrocarbon oil, the oxidized castor oil and hydrocarbon oil being immiscible, and all of the products being in emulsion in water.

4. An undissolved emulsified preparation for polish comprising unsaponified air blown castor oil, petroleum spindle oil, and water, said castor oil being blown at a temperature and pressure at which said castor oil is insoluble in said spindle oil and said castor oil is dispersed in the water.

5. An undissolved emulsified preparation for polish comprising water, a halogenated hydrocarbon, unsaponified castor oil blown at a temperature and pressure to retain the immiscibility of castor oil in the hydrocarbon, said castor oil and hydrocarbon being dispersed in said water.

6. An undissolved emulsified preparation for polish comprising water, mineral oil, unsaponified castor oil blown at a temperature and pressure to retain the immiscibility of castor oil in the mineral oil and ortho-dichlorbenzene.

7. An undissolved emulsified preparation for polish comprising water, mineral oil, unsaponified castor oil blown at a temperature and pressure to retain the immiscibility of castor oil in the mineral oil and a water soluble soap emulsifier.

8. An undissolved emulsified preparation for polish comprising water, a lubricant, unsaponified castor oil blown at a temperature and pressure at which the castor oil is retained immiscible in the lubricant, and a water soluble soap emulsifier, said castor oil and said oil being dispersed in said water.

9. An undissolved emulsified preparation for polish comprising unsaponified cold air blown castor oil, ammonia, mineral oil, a thinner, water, and petroleum spirit.

10. An undissolved emulsified preparation for polish comprising unsaponified cold air blown castor oil, ammonia, mineral oil, and water.

11. An undissolved emulsified preparation for polish comprising unsaponified cold air blown castor oil, ammonia, mineral oil, halogenated hydrocarbon thinner insoluble in water, and water.

12. An undissolved emulsified preparation comprising unsaponified castor oil, ammonia, petroleum spindle oil said castor oil being blown at a temperature and pressure at which it is immiscible in the spindle oil, a chlorinated cyclic hydrocarbon thinner in water.

13. A polishing emulsion containing water, a mineral oil, oxidized castor oil, undissolved and held in suspension in the mineral oil, and a chlorinated hydrocarbon.

14. A polishing emulsion containing water, mineral oil, air treated castor oil undissolved and held in suspension in the mineral oil, ammonia, orthodichlorbenzol and petroleum spirit.

15. A polishing emulsion containing water, petroleum oil, a finely divided air blown castor oil held undissolved and in suspension in the petroleum oil, a water soluble soap, said castor oil and petroleum being emulsified in the water and in the presence of the water soluble soap.

16. A polishing emulsion containing water, a lubricant, air blown castor oil held undissolved and in suspension in the lubricant, the castor oil and lubricant being emulsified in the water.

17. An emulsified preparation for polishing, comprising water, unsaponified oxidized castor oil; a lubricating oil, the castor oil and the lubricating oil being immiscible; and an emulsifier for emulsifying the castor oil and lubricating oil in the water.

18. An emulsified preparation for polishing, comprising water, unsaponified oxidized castor oil; a lubricating oil, the castor oil and the lubricating oil being immiscible; petroleum spirit; and an emulsifier for emulsifying the castor oil and lubricating oil in the water.

19. An emulsified preparation for polishing, comprising water, blown castor oil; a light lubricating oil; an emulsifier for emulsifying the castor oil and lubricating oil, said castor oil being immiscible in the lubricating oil.

20. An emulsified preparation for polishing comprising water, substantially unsaponified oxidized castor oil, a lubricating oil, the ratio of the castor oil to the lubricant by volume being approximately one to three, and the castor oil and lubricating oil being immiscible, all of the products being immiscible in each other and all of the products being in an emulsion in the water.

JOSEPH A. TUMBLER.

DISCLAIMER 1,969,387.—*Joseph A. Tumbler*, Baltimore, Md. CLEANSING AND POLISHING PREPARATION. Patent dated August 7, 1934. Disclaimer filed March 25, 1936, by the patentee; the assignee, *J. A. Tumbler Laboratories*, approving.

Hereby enters this disclaimer to that part of claim 16 in said specification which is in the following words, "air blown castor oil" except where the castor oil is pale blown.

[*Official Gazette April 21, 1936.*]

an emulsifier for emulsifying the castor oil and lubricating oil in the water.

19. An emulsified preparation for polishing, comprising water, blown castor oil; a light lubricating oil; an emulsifier for emulsifying the castor oil and lubricating oil, said castor oil being immiscible in the lubricating oil.

20. An emulsified preparation for polishing comprising water, substantially unsaponified oxidized castor oil, a lubricating oil, the ratio of the castor oil to the lubricant by volume being approximately one to three, and the castor oil and lubricating oil being immiscible, all of the products being immiscible in each other and all of the products being in an emulsion in the water.

JOSEPH A. TUMBLER.

DISCLAIMER 1,969,387.—*Joseph A. Tumbler*, Baltimore, Md. CLEANSING AND POLISHING PREPARATION. Patent dated August 7, 1934. Disclaimer filed March 25, 1936, by the patentee; the assignee, *J. A. Tumbler Laboratories*, approving.

Hereby enters this disclaimer to that part of claim 16 in said specification which is in the following words, "air blown castor oil" except where the castor oil is pale blown.

[*Official Gazette April 21, 1936.*]